(12) United States Patent
Harrison et al.

(10) Patent No.: US 11,262,864 B2
(45) Date of Patent: *Mar. 1, 2022

(54) METHOD AND APPARATUS FOR CLASSIFYING FINGER TOUCH EVENTS

(71) Applicant: QEEXO, CO., Mountainview, CA (US)

(72) Inventors: Christopher Harrison, Pittsburgh, PA (US); Julia Schwarz, Pittsburgh, PA (US); Robert Xiao, Pittsburgh (CA)

(73) Assignee: QEEXO, CO., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,080

(22) Filed: Dec. 5, 2017

(65) Prior Publication Data

US 2018/0095595 A1  Apr. 5, 2018

Related U.S. Application Data

(63) Continuation of application No. 14/612,089, filed on Feb. 2, 2015, now Pat. No. 9,864,454.

(51) Int. Cl.
*G06F 3/041* (2006.01)
*G06F 3/0488* (2022.01)
(Continued)

(52) U.S. Cl.
CPC ............ *G06F 3/0416* (2013.01); *G06F 3/043* (2013.01); *G06F 3/0482* (2013.01); *G06F 3/0488* (2013.01); *G06F 3/04842* (2013.01)

(58) Field of Classification Search
CPC ...... G06F 3/041; G06F 3/0412; G06F 3/0414; G06F 3/0416; G06F 3/042; G06F 3/0421;
(Continued)

(56) References Cited

U.S. PATENT DOCUMENTS 2,008,028 A   7/1935   McCortney
2,430,005 A   11/1947  Denneen
(Continued)

FOREIGN PATENT DOCUMENTS

CN   1161455      10/1997
CN   1797305 A    7/2006
(Continued)

OTHER PUBLICATIONS

U.S. Appl. No. 14/219,919, Non-Final Rejection, dated Dec. 11, 2019, 25 pgs.
(Continued)

*Primary Examiner* — Tom V Sheng
(74) *Attorney, Agent, or Firm* — Kwan & Olynick LLP

(57) ABSTRACT

A system for classifying touch events includes a touch screen configured to display an interactive element, one or more acoustic sensors coupled to the touch screen, a touch event detector configured to monitor the one or more acoustic sensors and to save acoustic signals sensed by the one or more acoustic sensors, wherein the touch event detector is further configured to detect touch events in which the interactive element is touched by a first or a second finger part of a user, and wherein the touch events result in generating the acoustic signals, and an acoustic classifier configured to classify the acoustic signals.

21 Claims, 14 Drawing Sheets

(51) Int. Cl.
*G06F 3/04842* (2022.01)
*G06F 3/043* (2006.01)
*G06F 3/0482* (2013.01)

(58) Field of Classification Search
CPC ...... G06F 3/0425; G06F 3/0428; G06F 3/043;
G06F 3/0433; G06F 3/0436; G06F 3/044;
G06F 3/045; G06F 3/046; G06F 3/047;
G06F 3/048; G06F 3/0481; G06F 3/0482;
G06F 3/0484; G06F 3/04842; G06F
3/04845; G06F 3/04847; G06F 3/0485;
G06F 3/0486; G06F 3/0487; G06F
3/0488; G06F 3/03547
USPC ........................................................ 345/173
See application file for complete search history.

(56) References Cited

U.S. PATENT DOCUMENTS

| | | | |
|---|---|---|---|
| 3,118,435 A | 1/1964 | Almquist | |
| 3,354,531 A | 11/1967 | Pryor | |
| 4,561,105 A | 12/1985 | Crane | |
| 4,597,932 A | 7/1986 | Kurihara | |
| 4,686,332 A | 8/1987 | Greanias | |
| 5,483,261 A | 1/1996 | Yasutake | |
| 5,544,265 A | 8/1996 | Bozinovic | |
| 5,596,656 A | 1/1997 | Goldberg | |
| 5,615,285 A | 3/1997 | Beernink | |
| 5,625,818 A | 4/1997 | Zarmer | |
| 5,666,438 A | 9/1997 | Beernink | |
| 5,867,163 A | 2/1999 | Kurtenbach | |
| 5,933,514 A | 8/1999 | Ostrem | |
| 6,028,593 A | 2/2000 | Rosenberg | |
| 6,118,435 A | 9/2000 | Fujita | |
| 6,208,330 B1 | 3/2001 | Hasegawa | |
| 6,212,295 B1 | 4/2001 | Ostrem | |
| 6,222,465 B1 | 4/2001 | Kumar | |
| 6,246,395 B1 | 6/2001 | Goyins | |
| 6,252,563 B1 | 6/2001 | Tada | |
| 6,323,846 B1 | 11/2001 | Westerman | |
| 6,337,698 B1 | 1/2002 | Keely, Jr. | |
| 6,492,979 B1 | 12/2002 | Kent | |
| 6,504,530 B1 | 1/2003 | Wilson | |
| 6,643,663 B1 | 11/2003 | Dabney | |
| 6,707,451 B1 | 3/2004 | Nagaoka | |
| 6,748,425 B1 | 6/2004 | Duffy | |
| 6,772,396 B1 | 8/2004 | Cronin | |
| 6,933,930 B2* | 8/2005 | Devige | G06F 3/0433 |
| | | | 178/18.04 |
| 6,943,665 B2 | 9/2005 | Chornenky | |
| 7,050,955 B1 | 5/2006 | Carmel | |
| 7,084,884 B1 | 8/2006 | Nelson | |
| 7,098,896 B2 | 8/2006 | Kushler | |
| 7,212,197 B1 | 5/2007 | Schkolne | |
| 7,443,396 B2 | 10/2008 | Ilic | |
| 7,581,194 B2 | 8/2009 | Iwema | |
| 7,982,724 B2 | 7/2011 | Hill | |
| 8,086,971 B2 | 12/2011 | Radivojevic | |
| 8,144,126 B2 | 3/2012 | Wright | |
| 8,154,524 B2 | 4/2012 | Wilson | |
| 8,154,529 B2 | 4/2012 | Sleeman | |
| 8,170,346 B2 | 5/2012 | Ludwig | |
| 8,199,126 B1 | 6/2012 | Taubman | |
| 8,253,744 B2 | 8/2012 | Macura | |
| 8,269,744 B2 | 9/2012 | Agari | |
| 8,327,029 B1 | 12/2012 | Purser | |
| 8,430,310 B1* | 4/2013 | Ho | G06F 21/35 |
| | | | 235/382 |
| 8,441,790 B2 | 5/2013 | Pance | |
| 8,547,357 B2 | 10/2013 | Aoyagi | |
| 8,624,878 B2 | 1/2014 | Sarwar | |
| 8,670,632 B2 | 3/2014 | Wilson | |
| 8,674,943 B2 | 3/2014 | Westerman | |
| 8,743,091 B2 | 6/2014 | Bernstein | |
| 8,760,395 B2 | 6/2014 | Kim | |
| 8,762,332 B2 | 6/2014 | Keebler | |
| 8,769,524 B2 | 7/2014 | Bhullar | |
| 9,013,452 B2* | 4/2015 | Harrison | G06F 3/0488 |
| | | | 345/177 |
| 9,019,244 B2 | 4/2015 | Harrison | |
| 9,030,498 B2 | 5/2015 | Galor | |
| 9,052,772 B2 | 6/2015 | West | |
| 9,060,007 B2 | 6/2015 | Keebler | |
| 9,182,882 B2 | 11/2015 | Fowler | |
| 9,329,688 B2 | 5/2016 | Harrison | |
| 9,329,715 B2 | 5/2016 | Schwarz | |
| 9,377,863 B2 | 6/2016 | Bychkov | |
| 9,465,494 B2* | 10/2016 | Harrison | G06F 3/0416 |
| 9,557,852 B2 | 1/2017 | Tsai | |
| 9,612,689 B2* | 4/2017 | Harrison | G06F 3/043 |
| 9,696,859 B1 | 7/2017 | Heller | |
| 9,864,453 B2 | 1/2018 | Munemoto | |
| 9,864,454 B2* | 1/2018 | Harrison | G06F 3/0482 |
| 10,082,935 B2 | 9/2018 | Harrison | |
| 10,318,034 B1 | 6/2019 | Hauenstein | |
| 2002/0009227 A1 | 1/2002 | Goldberg | |
| 2002/0057837 A1 | 5/2002 | Wilkinson | |
| 2002/0070927 A1 | 6/2002 | Fujitsuka | |
| 2002/0126161 A1 | 9/2002 | Kuzunuki | |
| 2003/0048260 A1 | 3/2003 | Matusis | |
| 2003/0110085 A1 | 6/2003 | Murren | |
| 2003/0132922 A1 | 7/2003 | Philipp | |
| 2003/0217873 A1* | 11/2003 | Paradiso | G06F 3/0433 |
| | | | 178/18.04 |
| 2004/0012573 A1 | 1/2004 | Morrison | |
| 2004/0021681 A1 | 2/2004 | Liao | |
| 2004/0054711 A1 | 3/2004 | Multer | |
| 2004/0141010 A1 | 7/2004 | Fitzmaurice | |
| 2004/0160421 A1 | 8/2004 | Sullivan | |
| 2004/0199867 A1 | 10/2004 | Brandenborg | |
| 2004/0225730 A1 | 11/2004 | Brown | |
| 2005/0083313 A1 | 4/2005 | Hardie-Bick | |
| 2005/0131778 A1 | 6/2005 | Bennett | |
| 2005/0146512 A1 | 7/2005 | Hill | |
| 2005/0146513 A1 | 7/2005 | Hill et al. | |
| 2005/0289461 A1 | 12/2005 | Amado | |
| 2006/0010400 A1 | 1/2006 | Dehlin | |
| 2006/0026535 A1 | 2/2006 | Hotelling | |
| 2006/0031746 A1 | 2/2006 | Toepfer | |
| 2006/0132456 A1 | 6/2006 | Anson | |
| 2006/0152499 A1 | 7/2006 | Roberts | |
| 2006/0173985 A1 | 8/2006 | Moore | |
| 2006/0184617 A1 | 8/2006 | Nicholas | |
| 2006/0217126 A1 | 9/2006 | Sohm | |
| 2006/0230021 A1 | 10/2006 | Diab | |
| 2006/0288329 A1 | 12/2006 | Gandhi | |
| 2007/0011205 A1 | 1/2007 | Majjasie | |
| 2007/0044010 A1 | 2/2007 | Sull | |
| 2007/0075965 A1 | 4/2007 | Huppi | |
| 2007/0085157 A1 | 4/2007 | Fadell | |
| 2007/0100959 A1 | 5/2007 | Eichstaedt | |
| 2007/0109279 A1 | 5/2007 | Sigona | |
| 2007/0126716 A1 | 6/2007 | Haverly | |
| 2007/0168367 A1 | 7/2007 | Dickinson | |
| 2007/0186157 A1 | 8/2007 | Walker | |
| 2007/0192674 A1 | 8/2007 | Bodin | |
| 2007/0245020 A1 | 10/2007 | Ott, IV | |
| 2007/0257767 A1 | 11/2007 | Beeson | |
| 2007/0291297 A1 | 12/2007 | Harmon | |
| 2008/0005666 A1 | 1/2008 | Sefton | |
| 2008/0036743 A1 | 2/2008 | Westerman | |
| 2008/0042978 A1 | 2/2008 | Perez-Noguera | |
| 2008/0082941 A1 | 4/2008 | Goldberg | |
| 2008/0103906 A1 | 5/2008 | Singh | |
| 2008/0117168 A1 | 5/2008 | Liu | |
| 2008/0126388 A1 | 5/2008 | Naaman | |
| 2008/0141132 A1 | 6/2008 | Tsai | |
| 2008/0155118 A1 | 6/2008 | Glaser | |
| 2008/0158147 A1 | 7/2008 | Westerman | |
| 2008/0158168 A1 | 7/2008 | Westerman | |
| 2008/0158185 A1 | 7/2008 | Westerman | |
| 2008/0168403 A1 | 7/2008 | Westerman | |
| 2008/0180406 A1 | 7/2008 | Han | |

(56) References Cited

U.S. PATENT DOCUMENTS

| | | |
|---|---|---|
| 2008/0244468 A1 | 10/2008 | Nishihara |
| 2008/0288347 A1 | 11/2008 | Sifry |
| 2008/0319932 A1 | 12/2008 | Yih |
| 2009/0025987 A1 | 1/2009 | Perski |
| 2009/0073144 A1 | 3/2009 | Chen |
| 2009/0095540 A1 | 4/2009 | Zachut |
| 2009/0150373 A1 | 6/2009 | Davis |
| 2009/0157206 A1 | 6/2009 | Weinberg |
| 2009/0174679 A1 | 7/2009 | Westerman |
| 2009/0178011 A1 | 7/2009 | Ording |
| 2009/0231275 A1 | 9/2009 | Odgers |
| 2009/0232355 A1 | 9/2009 | Minear |
| 2009/0254869 A1 | 10/2009 | Ludwig |
| 2009/0259628 A1 | 10/2009 | Farrell |
| 2009/0262637 A1 | 10/2009 | Badaye |
| 2009/0315835 A1 | 12/2009 | De Goes |
| 2009/0318192 A1 | 12/2009 | Leblanc |
| 2010/0036967 A1 | 2/2010 | Caine |
| 2010/0060602 A1 | 3/2010 | Agari |
| 2010/0085216 A1 | 4/2010 | Ms |
| 2010/0094633 A1 | 4/2010 | Kawamura |
| 2010/0123666 A1 | 5/2010 | Wickholm |
| 2010/0127997 A1 | 5/2010 | Park |
| 2010/0194703 A1 | 8/2010 | Fedor |
| 2010/0214267 A1 | 8/2010 | Radivojevic |
| 2010/0225601 A1 | 9/2010 | Homma |
| 2010/0251112 A1 | 9/2010 | Hinckley |
| 2010/0265185 A1 | 10/2010 | Oksanen |
| 2010/0271322 A1 | 10/2010 | Kondoh |
| 2010/0274622 A1 | 10/2010 | Kennedy |
| 2010/0279738 A1* | 11/2010 | Kim ................... G06F 3/016 455/566 |
| 2010/0289754 A1 | 11/2010 | Sleeman |
| 2010/0302184 A1 | 12/2010 | East |
| 2010/0306649 A1 | 12/2010 | Russ |
| 2010/0309158 A1 | 12/2010 | Iwayama |
| 2010/0309933 A1 | 12/2010 | Stark |
| 2011/0003550 A1 | 1/2011 | Klinghult |
| 2011/0007000 A1 | 1/2011 | Lim |
| 2011/0018825 A1* | 1/2011 | Kondo ................. G06F 3/0433 345/173 |
| 2011/0057670 A1 | 3/2011 | Jordan |
| 2011/0057885 A1 | 3/2011 | Lehtovirta |
| 2011/0074544 A1 | 3/2011 | D Souza |
| 2011/0074701 A1 | 3/2011 | Dickinson |
| 2011/0080349 A1 | 4/2011 | Holbein |
| 2011/0133934 A1 | 6/2011 | Tan |
| 2011/0134063 A1 | 6/2011 | Norieda |
| 2011/0134083 A1 | 6/2011 | Norieda |
| 2011/0141066 A1 | 6/2011 | Shimotani |
| 2011/0145706 A1 | 6/2011 | Wilson |
| 2011/0164029 A1 | 7/2011 | King |
| 2011/0167391 A1 | 7/2011 | Momeyer |
| 2011/0169763 A1 | 7/2011 | Westerman |
| 2011/0169778 A1 | 7/2011 | Nungester |
| 2011/0173235 A1 | 7/2011 | Aman |
| 2011/0175813 A1 | 7/2011 | Sarwar |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse |
| 2011/0238613 A1 | 9/2011 | Shehory |
| 2011/0246463 A1 | 10/2011 | Carson, Jr. |
| 2011/0246503 A1 | 10/2011 | Bender |
| 2011/0248927 A1* | 10/2011 | Michaelis ........... G06F 3/04845 345/173 |
| 2011/0248948 A1 | 10/2011 | Griffin |
| 2011/0261083 A1 | 10/2011 | Wilson |
| 2011/0298798 A1 | 12/2011 | Krah |
| 2011/0310040 A1 | 12/2011 | Ben-Shalom |
| 2012/0001875 A1 | 1/2012 | Li |
| 2012/0007821 A1 | 1/2012 | Zaliva |
| 2012/0007836 A1 | 1/2012 | Wu |
| 2012/0011106 A1 | 1/2012 | Reid |
| 2012/0019562 A1 | 1/2012 | Park |
| 2012/0051596 A1 | 3/2012 | Darnell |
| 2012/0056846 A1 | 3/2012 | Zaliva |
| 2012/0078942 A1 | 3/2012 | Cai |
| 2012/0096041 A1 | 4/2012 | Rao |
| 2012/0113017 A1 | 5/2012 | Benko |
| 2012/0120000 A1 | 5/2012 | Lucic |
| 2012/0131139 A1 | 5/2012 | Siripurapu |
| 2012/0146938 A1 | 6/2012 | Worfolk |
| 2012/0150871 A1 | 6/2012 | Hua |
| 2012/0158629 A1 | 6/2012 | Hinckley |
| 2012/0200517 A1 | 8/2012 | Nikolovski |
| 2012/0206330 A1 | 8/2012 | Cao |
| 2012/0262407 A1 | 10/2012 | Hinckley |
| 2012/0274583 A1 | 11/2012 | Haggerty |
| 2012/0280827 A1 | 11/2012 | Kashiwagi |
| 2012/0280927 A1 | 11/2012 | Ludwig |
| 2012/0287056 A1 | 11/2012 | Ibdah |
| 2012/0287076 A1 | 11/2012 | Dao |
| 2012/0313969 A1 | 12/2012 | Szymczyk |
| 2012/0324349 A1 | 12/2012 | Pop-Lazarov |
| 2013/0009896 A1 | 1/2013 | Zaliva |
| 2013/0014248 A1 | 1/2013 | McLaughlin |
| 2013/0027404 A1 | 1/2013 | Sarnoff |
| 2013/0038554 A1 | 2/2013 | West |
| 2013/0091123 A1 | 4/2013 | Chen |
| 2013/0100071 A1 | 4/2013 | Wright |
| 2013/0141382 A1 | 6/2013 | Simmons |
| 2013/0176264 A1 | 7/2013 | Alameh |
| 2013/0176270 A1 | 7/2013 | Cattivelli |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley |
| 2013/0257757 A1 | 10/2013 | Kim |
| 2013/0265269 A1 | 10/2013 | Sharma |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller |
| 2013/0316813 A1 | 11/2013 | Derome |
| 2013/0328813 A1 | 12/2013 | Kuo |
| 2013/0335333 A1 | 12/2013 | Kukulski |
| 2014/0007002 A1 | 1/2014 | Chang |
| 2014/0009401 A1* | 1/2014 | Bajaj ................. G06F 3/043 345/173 |
| 2014/0022189 A1 | 1/2014 | Sheng |
| 2014/0032880 A1 | 1/2014 | Ka |
| 2014/0037951 A1 | 2/2014 | Shigetomi |
| 2014/0071095 A1 | 3/2014 | Godsill |
| 2014/0082545 A1 | 3/2014 | Zhai |
| 2014/0104191 A1 | 4/2014 | Davidson |
| 2014/0104192 A1 | 4/2014 | Davidson |
| 2014/0104274 A1 | 4/2014 | Hilliges |
| 2014/0109004 A1 | 4/2014 | Sadhvani |
| 2014/0168116 A1 | 6/2014 | Sasselli |
| 2014/0192023 A1 | 7/2014 | Hoffman |
| 2014/0208275 A1 | 7/2014 | Mongia |
| 2014/0210788 A1 | 7/2014 | Harrison |
| 2014/0210791 A1 | 7/2014 | Hanauer |
| 2014/0240271 A1 | 8/2014 | Land |
| 2014/0240295 A1 | 8/2014 | Harrison |
| 2014/0253477 A1 | 9/2014 | Shim |
| 2014/0267065 A1* | 9/2014 | Levesque ................. G06F 3/016 345/173 |
| 2014/0267085 A1 | 9/2014 | Li |
| 2014/0289659 A1 | 9/2014 | Harrison |
| 2014/0300559 A1 | 10/2014 | Tanimoto |
| 2014/0327626 A1 | 11/2014 | Harrison |
| 2014/0331313 A1 | 11/2014 | Kim |
| 2014/0368436 A1 | 12/2014 | Abzarian |
| 2015/0002405 A1 | 1/2015 | Kuan |
| 2015/0035759 A1 | 2/2015 | Harrison |
| 2015/0077378 A1 | 3/2015 | Duffield |
| 2015/0145820 A1 | 5/2015 | Huang |
| 2015/0242009 A1 | 8/2015 | Xiao |
| 2015/0253858 A1 | 9/2015 | Koukoumidis |

(56) References Cited

U.S. PATENT DOCUMENTS

| | | | |
|---|---|---|---|
| 2015/0293592 A1* | 10/2015 | Cheong | G06F 3/016 345/173 |
| 2016/0012348 A1 | 1/2016 | Johnson | |
| 2016/0018942 A1 | 1/2016 | Kang | |
| 2016/0062545 A1 | 3/2016 | Lai | |
| 2016/0077615 A1 | 3/2016 | Schwarz | |
| 2016/0077650 A1 | 3/2016 | Durojaiye | |
| 2016/0077664 A1 | 3/2016 | Harrison | |
| 2016/0085324 A1 | 3/2016 | Schwarz | |
| 2016/0085333 A1 | 3/2016 | Christopher | |
| 2016/0085372 A1 | 3/2016 | Munemoto | |
| 2016/0098185 A1 | 4/2016 | Xiao | |
| 2016/0117015 A1 | 4/2016 | Veneri | |
| 2016/0156837 A1 | 6/2016 | Rodzevski | |
| 2016/0171192 A1 | 6/2016 | Holz | |
| 2016/0224145 A1 | 8/2016 | Harrison | |
| 2016/0231865 A1 | 8/2016 | Harrison | |
| 2016/0299615 A1 | 10/2016 | Schwarz | |
| 2017/0024892 A1 | 1/2017 | Harrison | |
| 2017/0060279 A1 | 3/2017 | Harrison | |
| 2017/0153705 A1 | 6/2017 | Kim | |

FOREIGN PATENT DOCUMENTS

| | | |
|---|---|---|
| CN | 1928781 A | 3/2007 |
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102004925 | 4/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| CN | 104160364 | 11/2014 |
| EP | 0938039 A2 | 8/1999 |
| EP | 1659481 A2 | 5/2006 |
| EP | 1762926 A2 | 3/2007 |
| EP | 2136358 A1 | 12/2009 |
| EP | 2280337 A2 | 2/2011 |
| GB | 2344894 A | 6/2000 |
| GB | 2468742 A | 9/2010 |
| JP | H0969137 A | 3/1997 |
| JP | 2004213312 A | 7/2004 |
| JP | 2005018611 A | 1/2005 |
| JP | 2007524970 A | 8/2007 |
| JP | 2009543246 A | 12/2009 |
| JP | 2011028555 A | 2/2011 |
| JP | 2013519132 A | 5/2013 |
| JP | 2013532495 A | 8/2013 |
| KR | 20020075283 A | 10/2002 |
| KR | 20110061227 A | 6/2011 |
| KR | 20120100351 A | 9/2012 |
| WO | 9404992 A1 | 3/1994 |
| WO | 2006070044 A1 | 7/2006 |
| WO | 2008126347 A1 | 10/2008 |
| WO | 2009071919 A1 | 6/2009 |
| WO | 2011096694 A2 | 8/2011 |
| WO | 2012064034 A1 | 5/2012 |
| WO | 2012166277 A1 | 12/2012 |
| WO | 2013059488 A1 | 4/2013 |
| WO | 2013061998 A1 | 5/2013 |
| WO | 2014037951 A1 | 3/2014 |
| WO | 2014182435 A1 | 11/2014 |

OTHER PUBLICATIONS

U.S. Appl. No. 15/815,679, Final Rejection, dated Jan. 16, 2020, 19 pgs.

"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.

"Swype Advanced Tips", [http://www.swype.com/tips/advanced-tips], Jun. 25, 2014, retrieved via the Wayback Machine on Jun. 29, 2018, [https:web.archive.Org/web/20140625073212/http://www.swype.com/tips/advanced-tips], 2 Pages.

"Swype Basics", [http://www.swype.com/tips/swype-basics], retrieved via the Wayback Machine dated Jun. 14, 2014,—retrieved via the Wayback Machine on Jun. 29, 2018, [https:web.archive.org/web/20140614200707/http://www.swype.mm/tips/swype-basics, 2 pages.

"Swype Tips", [http://www.swype.com/category/tips], Jul. 2, 2014, retrieved via the Wayback Machine on Jun. 29, 2018, [https:web.archive.Org/web/20140702102357/http://www.swype.com/category/tips, 2 pages.

"Mimio", http://www.mimio.com, retrieved Jul. 8, 2019, 8 pages.

U.S. Appl. No. 15/832,080, Non-Final Rejection, dated Mar. 9, 2020,13 pgs.

U.S. Appl. No. 15/832,080, oa.appendix—Office Action Appendix, dated Mar. 9, 2020, 1 pg.

Asano et al., "Real-Time Sound Source Localization and Separation System and Its Application to Automatic Speech Recognition", Proceedings of Eurospeech, 2001; p. 1013-1016; 2001.

Benko et al. "Sphere: Multi-Touch Interactions on a Spherical Display", Proceedings of UIST, 2008; pp. 77-86.

Burges, Christopher, "A Tutorial on Support Vector Machines for Pattern Recognition," Data Mining and Knowledge Discovery, vol. 2, Issue 2, pp. 121-167, Jun. 1998.

Cao et al., "ShapeTouch: Leveraging Contact Shape on Interactive Surfaces", IEEE International Workshop on Horizontal Interactive Human Computer System (Tabletop), 2008, pp. 139-146.

Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013, 9 pages.

Chinese First Office Action received for Chinese Patent Application No. 201510240372.6 dated Sep. 27, 2018, 18 pages (including English Translation).

Chinese First Office Action received for Chinese Patent Application Serial No. 201580051873.8 dated Jun. 21, 2019, 15 pages (Including English Translation).

Chinese Office Action dated Apr. 15, 2016 for Chinese Application No. 201280062500.7, 11 pages.

Chinese Office Action dated Apr. 21, 2017 for Chinese Patent Application No. 201480022056.5, 23 pages. (with Translation).

Chinese Office Action dated Feb. 9, 2018 for Chinese Patent Application No. 201480022056.5, 19 pages. (with Translation).

Chinese Office Action for Chinese Patent Application No. 201280062500.7 dated Apr. 17, 2017,15 pages (including English Translation).

Chinese Office Action for Chinese Patent Application No. 201280062500.7 dated Nov. 7, 2016, 9 pages.

Chinese Office Action for Chinese Patent Application No. 201280062500.7, dated Apr. 27, 2018, 19 pages (with English Translation).

Chinese Office Action for Chinese Patent Application No. 201280062500.7, dated Oct. 10, 2018, 14 pages.

Chinese Office Action for Chinese Patent Application No. 201510240522.3 dated Jun. 28, 2018, 30 pages (including English Translation).

Chinese Search Report dated Mar. 29, 2016 for Chinese Application No. 201280062500.7, 1 page.

Chinese Search Report received for Chinese Patent Application No. 201580053216.7, dated Apr. 16, 2019, 2 Pages.

Chinese Second Office Action received for Chinese Patent Application No. 201510240372.6 dated May 15, 2019, 16 Pages (including English Translation).

Chinese Second Office Action received for Chinese Patent Application No. 201580000833.0 dated Jan. 15, 2018, 17 pages.

(56) References Cited

OTHER PUBLICATIONS

Communication pursuant to Article 94(3) EPC for EP Application No. 12842495.9 dated Jun. 18, 2018, 4 pages.
Communication pursuant to Article 94(3) EPC for European Patent Application No. 14785422.8 dated Nov. 22, 2018, 5 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Communication pursuant to Article 94(3) EPC for European Patent Application No. 15843933.1 dated Jan. 23, 2019, 6 pages.
Communication pursuant to Article 94(3) EPC for European Patent Application No. 15845310.0 dated Jan. 3, 2019, 4 pages.
Communication pursuant to Article 94(3) EPC dated Feb. 26, 2018 in European Patent Application No. 14785422.8, 7 pages.
Communication pursuant to Article 94(3) EPC dated Mar. 5, 2018 in European Patent Application No. 14794212.2, 5 pages.
Communication pursuant to Article 94(3) EPC received for European Patent Application No. 14832247.2 dated May 3, 2019, 7 pages.
Communication pursuant to Rules 70(2) and 70a(2) EPC received for European Patent Application No. 16818725.0 dated Jan. 8, 2019, 1 page.
Communication pursuant to Rules 70(2) and 70a(2) EPC received for European Patent Application No. 16839786.7 dated Mar. 1, 2019, 1 page.
Corrected Notice of Allowability dated Jan. 11, 2021 for U.S. Appl. No. 16/404,694 (pp. 1-2).
Corrected Notice of Allowability dated Jan. 25, 2021 for U.S. Appl. No. 16/404,694 (pp. 1-5).
Deyle et al., "Hambone: A Bio-Acoustic Gesture Interface", Proceedings of ISWC, 2007, pp. 1-8.
Dietz et al., "DiamondTouch: A Multi-User Touch Technology" ACM Symposium on User Interface Software & Technology (UIST), 2001, pp. 219-226.
Dietz et al., DT Controls: Adding Identity to Physical Interfaces, ACM Symposium on User Interface Software & Technology (UIST), 2005, pp. 245-252.
English Translation of Chinese Office Action dated Nov. 3, 2017 in Chinese Application No. 201480002856.0, 12 pages.
English Translation of Decision of Refusal dated Nov. 10, 2016 in Japanese Patent Application No. 2014-537253. 3 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Apr. 15, 2016 in Chinese Patent Application No. 201280062500.7. 11 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
English Translation of Notification of Reasons for Refusal dated Apr. 15, 2016 in Japanese Patent Application No. 2014-537253. 3 pages.
English Translation of Office Action dated May 9, 2017 in Japanese Patent Application No. 2014-537253. 5 pages.
English Translation of Second Office Action dated Jul. 6, 2017 in Chinese Application No. 201480002879.1, 14 pages.
English Translation of Second Office Action dated Nov. 7, 2016 in Chinese Patent Application No. 201280062500.7. 9 pages.
English Translation of Third Office Action dated Oct. 16, 2017 in Chinese Application No. 201480002879.1, 4 pages.
European Patent Office Extended Search Report for EP 14 79 4212; dated Nov. 9, 2016, 8 pages.
European Patent Office Extended Search Report for EP 14 83 2247; dated Feb. 23, 2017, 11 pages.
European Search Report dated Apr. 8, 2019 for European Application No. 18195588.1, 7 pages.
European Search Report received for European Patent Application No. 16818725.0, dated Dec. 21, 2018, 8 Pages.
European Search Report received for European Patent Application No. 16839786.7, dated Feb. 12, 2019, 8 Pages.
European Search Report received for European Patent Application Serial No. 12842495.9, dated Jul. 24, 2015, 7 Pages.
Extended European Search Report dated Apr. 16, 2018 in European Application No. 15845310.0, 7 pages.
Extended European Search Report dated Aug. 11, 2016 in European Patent Application No. 14785422.8, 8 Pages.
Extended European Search Report dated Aug. 25, 2017 in European Patent Application No. 157 48667.1, 10 pages.
Extended European Search Report dated Jul. 22, 2014 in European Patent Application No. 12755563.9, 5 Pages.
Extended European Search Report dated Mar. 16, 2018 in European Patent Application No. 15842839.1, 7 Pages.
Extended European Search Report dated Mar. 19, 2018 in European Patent Application No. 15840819.5, 9 Pages.
Extended European Search Report dated Mar. 19, 2018 in European Patent Application No. 15843933.1, 8 Pages.
Extended European Search Report dated Mar. 27, 2018 in European Patent Application No. 15843989.3, 8 Pages.
Extended European Search Report dated May 14, 2018 in European Patent Application No. 15847469.2, 11 pages.
Final Office Action issued for U.S. Appl. No. 15/206,554 dated Feb. 1, 2017, 20 pages.
Final Office Action dated Aug. 8, 2018 in U.S. Appl. No. 14/834,434, 19 pages.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Final Office Action dated Jan. 5, 2018 in U.S. Appl. No. 14/503,894, 16 pages.
Final Office Action dated Jan. 9, 2018 in U.S. Appl. No. 13/863,193, 50 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 4, 2015 in U.S. Appl. No. 13/863,193, 50 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Nov. 28, 2014 in U.S. Appl. No. 13/849,698, 21 pages.
Final Office Action dated Feb. 24, 2016 U.S. Appl. No. 13/887,711, 23 pages.
Final Office Action dated Sep. 6, 2017 in U.S. Appl. No. 14/486,800, 17 pages.
Final Office Action dated Sep. 15, 2016 in U.S. Appl. No. 13/863,193, 50 pages.

(56) References Cited

OTHER PUBLICATIONS

Final Office Action received for U.S. Appl. No. 14/191,329, dated Aug. 7, 2015, 29 pages.
Final Office Action received for U.S. Appl. No. 13/887,711, dated Jun. 8, 2017, 33 pages.
Final Office Action received for U.S. Appl. No. 13/958,427, dated Jun. 19, 2015, 17 pages.
Final Office Action received for U.S. Appl. No. 14/492,604, dated Mar. 17, 2017, 37 pages.
Final Office Action received for U.S. Appl. No. 14/684,407 dated Jan. 18, 2017, 20 pages.
Final Office Action received for U.S. Appl. No. 14/684,407 dated Mar. 12, 2018, 14 pages.
Final Office Action received for U.S. Appl. No. 13/887,711 dated Jul. 25, 2019, 24 pages.
Final Office Action received for U.S. Appl. No. 14/242,127 dated Mar. 31, 2016, 34 pages.
Final Office Action received for U.S. Appl. No. 14/242,127 dated Sep. 18, 2015, 28 pages.
Final Office Action received for U.S. Appl. No. 14/495,041 dated Aug. 9, 2019, 26 pages.
Final Office Action received for U.S. Appl. No. 14/684,407 dated Sep. 20, 2019, 26 pages.
Final Office Action received for U.S. Appl. No. 15/075,648 dated Dec. 21, 2018, 13 pages.
Final Office Action received for U.S. Appl. No. 15/075,648 dated May 31, 2019, 17 pages.
Final Office Action received for U.S. Appl. No. 15/198,062 dated Sep. 6, 2018, 32 pages.
Final Office Action received for U.S. Appl. No. 16/126,175 dated Aug. 2, 2019, 161 pages.
Final Office Action received for U.S. Appl. No. 14/219,919, dated Aug. 26, 2016, 24 pages.
Final Office Action received for U.S. Appl. No. 14/834,434, dated May 1, 2017, 18 pages.
Final Office Action received for U.S. Appl. No. 15/073,407, dated Dec. 20, 2016, 49 pages.
Final Office Action received for U.S. Appl. No. 14/684,407 dated Jun. 10, 2019, 26 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
First Office Action received for Canadian Patent Application No. 2869699, dated Nov. 27, 2014, 3 pages.
Gutvvin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations, vol. 11, No. 1, 2009, pp. 10-18.
Harrison et al., "Scratch Input: Creating Large, Inexpensive, Unpowered and Mobile Finger Input Surfaces", Proceedings of UIST, 2008, pp. 205-208.
Harrison et al., Skinput: Appropriating the Body as an Input Surface, Proceedings of CHI, Apr. 10-15, 2010, pp. 453-462.
Hartmann et al., "Augmenting Interactive Tables with Mice & Keyboards", Proceedings of UIST, 2009, pp. 149-152.
Hinckley et al., "Manual Deskterity: An Exploration of Simultaneous Pen+Touch Direct Input", Proceedings of CHI, 2010, pp. 2793-2802.
Hinckley et al., "Pen+Touch=New Tools", Proceedings of UIST, 2010, pp. 27-36.
Hinckley et al., "Sensor Synaesthesia: Touch in Motion, and Motion in Touch", Proceedings of CHI, 2011, pp. 801-810.
Holz et al., "The Generalized Perceived Input Point Model and How to Double Touch Accuracy by Extracting Fingerprints" Proceedings of CHI, 2010, pp. 581-590.
International Search Report and Written Opinion for PCT/US2015/014581; dated May 14, 2015, 7 pages.
International Search Report and Written Opinion for PCT/US2015/047428; dated Nov. 27, 2015, 6 pages.
International Search Report and Written Opinion for PCT/US2015/047616; dated Jul. 1, 2016, 7 pages.
International Search Report and Written Opinion for PCT/US2015/050570; dated Dec. 17, 2015, 8 pages.
International Search Report and Written Opinion for PCT/US2015/051106; dated Jan. 28, 2016, 9 pages.
International Search Report and Written Opinion for PCT/US2015/051355; dated Dec. 15, 2015, 9 pages.
International Search Report and Written Opinion for PCT/US2015/051582; dated Feb. 26, 2016, 12 pages.
International Search Report and Written Opinion for PCT/US2016/040194; dated Sep. 19, 2016, 7 pages.
International Search Report and Written Opinion for PCT/US2016/044552; dated Oct. 17, 2016, 14 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
International Search Report and Written Opinion received for International Patent Application No. PCT/US2012/060865 dated Mar. 29, 2013, 10 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
International Search Report and Written Opinion received for PCT Application No. PCT/US2014/049485 dated Nov. 17, 2014, 13 pages.
Japanese Office Action dated Aug. 1, 2018 for Japanese Patent Application No. 2017-049566, 9 pages (including English translation).
Japanese Office Action for Japanese Patent Application No. 2014-537253 dated May 16, 2017, 5 pages (including English Translation).
Japanese Office Action for Japanese Patent Application No. 2014-537253 dated Apr. 26, 2016, 3 pages.
Japanese Office Action for Japanese Patent Application No. 2014-537253 dated Nov. 15, 2016, 3 pages.
Japanese Office Action for Japanese Patent Application No. 2017-049566 dated Jun. 5, 2018, 7 pages (including English Translation).
Kaltenbrunner, M. et al., "reacTIVision: A Computer-Vision Framework for Table-Based Tangible Interaction," Proceedings of TEI, 2007, pp. 69-74.
Kashino, K., "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
Kherallah, M et al., "On-line handwritten digit recognition based on trajectory and velocity modeling," Pattern Recognition Letters, vol. 29, Issue 5, pp. 580-594, Apr. 1, 2008.
Korean Office Action dated Jan. 10, 2019 for Korean Patent Application No. 2014-7010323, 11 pages (including English translation).
Matsushita et al., "HoloWall: Designing a Finger, Hand, Body, and Object Sensitive Wall", Proceedings of UIST, 1997, pp. 209-210.
Non-Final Office Action dated Apr. 19, 2017 in U.S. Appl. No. 14/869,998, 7 pages.
Non-Final Office Action dated Apr. 6, 2017 in U.S. Appl. No. 13/863,193, 70 pages.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jan. 7, 2016 in U.S. Appl. No. 13/863,193, 58 pages.

(56) References Cited

OTHER PUBLICATIONS

Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jul. 30, 2018 in U.S. Appl. No. 15/406,770, 20 pages.
Non-Final Office Action dated Jun. 9, 2016 in U.S. Appl. No. 14/612,089, 11 pages.
Non-Final Office Action dated Jun. 13, 2016 in U.S. Appl. No. 15/073,407, 49 pages.
Non-Final Office Action dated Jun. 24, 2014 in U.S. Appl. No. 13/849,698, 21 pages.
Non-Final Office Action dated Jun. 26, 2018 in U.S. Appl. No. 14/486,800, 25 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 16, 2014 in U.S. Appl. No. 13/780,494, 10 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 2, 2014 in U.S. Appl. No. 13/863,193, 41 pages.
Non-Final Office Action dated Sep. 8, 2016 in U.S. Appl. No. 14/492,604, 14 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Non-Final Office Action received for U.S. Appl. No. 13/887,711, dated Apr. 6, 2015, 36 pages.
Non-Final Office Action received for U.S. Appl. No. 14/483,150 dated Dec. 18, 2015, 7 pages.
Non-Final Office Action received for U.S. Appl. No. 14/492,604, dated Oct. 1, 2015, 16 pages.
Non-Final Office Action received for U.S. Appl. No. 14/495,041, dated Nov. 25, 2016, 35 pages.
Non-Final Office Action received for U.S. Appl. No. 14/503,894, dated Dec. 30, 2015, 18 pages.
Non-Final Office Action received for U.S. Appl. No. 14/503,894, dated May 16, 2017, 33 pages.
Non-Final Office Action received for U.S. Appl. No. 14/612,089 dated May 31, 2017, 21 pages.
Non-Final Office Action received for U.S. Appl. No. 14/684,407 dated Aug. 2, 2017, 14 pages.
Non-Final Office Action received for U.S. Appl. No. 14/684,407 dated Jul. 8, 2016, 11 pages.
Non-Final Office Action received for U.S. Appl. No. 15/075,648, dated Apr. 21, 2017, 8 pages.
Non-Final Office Action received for U.S. Appl. No. 14/191,329 dated Jul. 16, 2019, 30 pages.
Non-Final Office Action received for U.S. Appl. No. 14/242,127 dated Dec. 28, 2015, 38 pages.
Non-Final Office Action received for U.S. Appl. No. 14/242,127 dated Jun. 2, 2015, 33 pages.
Non-Final Office Action received for U.S. Appl. No. 14/834,434 dated Aug. 5, 2019, 19 pages.
Non-Final Office Action received for U.S. Appl. No. 15/206,554 dated Sep. 21, 2016, 36 pages.
Non-Final Office Action received for U.S. Appl. No. 15/815,679 dated Sep. 28, 2018, 69 pages.
Non-Final Office Action received for U.S. Appl. No. 15/836,798 dated Jul. 5, 2019, 95 pages.
Non-Final Office Action received for U.S. Appl. No. 16/126,175 dated Nov. 1, 2018, 86 pages.
Non-Final Office Action received for U.S. Appl. No. 13/958,427, dated Mar. 13, 2015, 50 pages.
Non-Final Office Action received for U.S. Appl. No. 13/958,427, dated Nov. 10, 2016, 22 pages.
Non-Final Office Action received for U.S. Appl. No. 14/191,329, dated Feb. 2, 2017, 20 pages.
Non-Final Office Action received for U.S. Appl. No. 14/486,800, dated Dec. 1, 2016, 29 pages.
Non-Final Office Action received for U.S. Appl. No. 14/684,407, dated Sep. 14, 2018, 24 pages.
Non-Final Office Action received for U.S. Appl. No. 14/751,589, dated Jun. 13, 2016, 20 pages.
Non-Final Office Action received dated Nov. 5, 2015 U.S. Appl. No. 13/887,711, 19 pages.
Non-Final Office Action—dated Oct. 2, 2015 U.S. Appl. No. 14/486,800, filed Sep. 15, 2014, 21 pages.
Non-Final Office Action—dated Oct. 7, 2015 U.S. Appl. No. 14/495,041, 14 pages.
Non-Final Office Action—dated Jan. 29, 2016 U.S. Appl. No. 14/219,919, 11 pages.
Notice of Allowance dated Feb. 4, 2021 for U.S. Appl. No. 15/406,770 (pp. 1-8).
Notice of Allowance issued in U.S. Appl. No. 16/404,694, dated Dec. 3, 2020, 8 pages.
Notice of Allowance dated Dec. 6, 2016 in U.S. Appl. No. 14/751,589, 27 pages.
Notice of Allowance dated Feb. 2, 2015 in U.S. Appl. No. 13/780,494, 43 pages.
Notice of Allowance dated Jan. 26, 2015 in U.S. Appl. No. 13/849,698, 27 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Office Action dated Aug. 10, 2018 for U.S. Appl. No. 15/886,562, 86 pages.
Office Action dated Jan. 28, 2019 for U.S. Appl. No. 15/836,798, 30 pages.
Office Action dated Mar. 30, 2018 for U.S. Appl. No. 15/886,562, 44 pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso, J. et al., "Sensor Systems for Interactive Surfaces," IBM Systems Journal, vol. 39, Issue 3-4, pp. 892-914, 2000.
Patten, James, Mcmichael., "Sensetable: A Wireless Object Tracking Platform for Tangible User Interfaces", Proceedings of CHI, 2001, pp. 253-260.

(56) References Cited

OTHER PUBLICATIONS

Pedro, L et al., "Augmenting touch interaction through acoustic sensing", Proceedings of the ACM International 3onference on Interactive Tabletops and Surfaces, pp. 53-56, Nov. 13-16, 2011.
Rekimoto et al., "Augmented Surfaces: A Spatially Continuous Work Space for Hybrid Computing Environments", Proceedings of CHI, 1999, pp. 378-385.
Rekimoto et al., "SmartSkin: An Infrastructure for Freehand Manipulation on Interactive Surfaces", Proceedings of CHI, 2002, pp. 113-120.
Rekimoto et al., "ToolStone: Effective use of the Physical Manipulation Vocabularies of Input Devices", Proceedings of UIST, 2000, pp. 109-117.
S. Furui, "Digital Speech Processing, synthesis, and recognition" Marcel Dekker, Inc. 2001. 40 pages.
Sarah, M. K. et al., "A Personal Touch—Recognizing Users Based on Touch Screen Behavior," PhoneSense'12, Nov. 6, 2012, Toronto, ON, Canada, Nov. 6, 2012, 5 pages.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
Second Office Action received for Canadian Patent Application No. 2869699, dated Jun. 14, 2016, 4 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Stevan Vigneaux, Director of Product Management, Mimio, "Choosing and Installing a Whiteboard for a Touch Projector", www.mimio.boxlight.com, Jan. 15, 2020. 10 pages.
Third Chinese Office Action received for Chinese Patent Application No. 201480022056.5 dated Jul. 19, 2018, 6 pages (with English translation).
Third Office Action received for Canadian Patent Application No. 2869699, dated Jan. 9, 2017, 3 pages.
U.S. Appl. No. 13/780,494, filed Feb. 28, 2013, titled: "Input Tools Having Viobro-Acoustically Distinct Regions and Computing Device for Use With the Same." 34 pages.
U.S. Appl. No. 14/483,150, filed Sep. 11, 2014, titled: "Method and Apparatus for Differentiating Touch Screen Users Based on Touch Event Analysis."
U.S. Appl. No. 14/492,604, filed Sep. 22, 2014, titled: "Method and Apparatus for Improving Accuracy of Touch Screen Event Analysis by Use of Edge Classification."
U.S. Appl. No. 14/495,041, filed Sep. 24, 2014, titled: "Method for Improving Accuracy of Touch Screen Event Analysis by Use of Spatiotemporal Touch Patterns."
U.S. Appl. No. 14/191,329, filed Feb. 26, 2014, titled "Using Capacitive Images for Touch Type Classification", 42 pages.
U.S. Appl. No. 13/849,698, filed Mar. 25, 2013, titled: "Method and System for Activating Different Interactive Functions Using Different Types of Finger Contacts.", 52 pages.
U.S. Appl. No. 13/887,711, filed May 6, 2013, titled: "Using Finger Touch Types to Interact with Electronic Devices.",42 pages.
U.S. Appl. No. 13/958,427, filed Aug. 2, 2013, titled: "Capture of Vibro-Acoustic Data Used to Determine Touch Types.",45 pages.
U.S. Appl. No. 14/242,127, filed Apr. 1, 2014, titled: "Method and Apparatus for Classifying Touch Events on a Touch Sensitive Surface.", 36 pages.
U.S. Appl. No. 14/483,150, filed Sep. 11, 2014, titled: "Method and Apparatus for Differentiating Touch Screen Users Based on Touch Event Analysis.", 38 pages.
U.S. Appl. No. 14/492,604, filed Sep. 22, 2014, titled: "Method and Apparatus for Improving Accuracy of Touch Screen Event Analysis by Use of Edge Classification.", 35 pages.
U.S. Appl. No. 14/495,041, filed Sep. 24, 2014, titled: "Method for Improving Accuracy of Touch Screen Event Analysis by Use of Spatiotemporal Touch Patterns.", 34 pages.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
Weidong, S. et al., "SenGuard: Passive user identification on smartphones using multiple sensors," IEEE 7th International Conference on Wireless and Mobile Computing, Networking and Communications (WiMob), pp. 141-148, 2011.

\* cited by examiner

METHOD AND APPARATUS FOR CLASSIFYING FINGER TOUCH EVENTS

CROSS-REFERENCE TO RELATED APPLICATION

This application is a continuation of application Ser. No. 14/612,089 filed on Feb. 2, 2015 having the title "METHOD AND APPARATUS FOR CLASSIFYING FINGER TOUCH EVENTS ON A TOUCHSCREEN", which is a continuation of application Ser. No. 13/849,698 filed on Mar. 25, 2013 having the title "METHOD AND SYSTEM FOR ACTIVATING DIFFERENT INTERACTIVE FUNCTIONS USING DIFFERENT TYPES OF FINGER CONTACTS."

TECHNICAL FIELD

The present invention relates to classifying touch events, and more particularly, to a method and system for classifying vibro-acoustic signals to identify a finger part used to touch an interactive element displayed on a touch screen.

BACKGROUND ART

Many technologies exist that have the ability to digitize different types of input. There are two main touch sensing approaches: active and passive. The key downside of active approaches is that an explicit object must be used (e.g., a special pen), which is implemented with electronics (and potentially batteries). For example, pens augmented with infrared light emitters on their tips can be used on the commercially available Microsoft Surface. There have also been efforts to move beyond pens, including, e.g., infrared-light-emitting brushes for painting applications. Current systems generally do not attempt to discriminate among different pens (just perhaps pen from finger input). Variably-modulated infrared light enables identification, but requires specialized hardware. Additionally, ultrasonics can be used for input localization, and can provide pen ID as well. Capacitive coupling allows users or objects to be localized and identified, though this typically requires grounding plates or a physical connection to function.

Sensing based on electromagnetic resonance, another method, operates between active and passive. Although the tools and tangibles need not be powered, they contain a resonant coil that is excited by proximate EM fields, generated by the specialized tablet they operate on. It is also possible to support object identification through a combination of RFID and vision processing, which offers greater scalability.

Fiducial markers are a truly passive approach. They provide the ID of an object through a uniquely patterned tag—often in a sticker form factor. This method has been shown to be very capable—the only major drawback is the size of the marker, which in general, prevents placement on small surfaces like the tip of a pen. Fiducial markers can also work in a capacitive-sensing manner, allowing tags to be embedded in an object. Additionally, the shape of an object can be captured optically and used for classification (e.g., mice and keyboards).

In general, the aforementioned techniques require instrumentation of the object providing input, which is problematic for fingers (i.e., people do not like to wear things on their fingers and hands). Researchers have also looked at wrist-mounted acoustic sensors that can classify finger-on-finger actions, such as pinching or flicking Finger taps can also be localized on the body through acoustic fingerprinting.

However, the latter systems require sensors to be placed on the user. Without instrumentation, some areas of the finger can be determined through computer vision (e.g., pad vs. tip). Using accelerometers or acoustics, soft and hard taps can be discriminated.

Contemporary interactive surfaces generally treat finger touches as a single class of input (a partial exception to this are finger-print scanning systems, which can capture a high-resolution fingerprint image to infer the 3D "posture" of a finger; also, area of contact via optical or capacitive sensing can be considered an extra input dimension). However, this is a gross simplification—fingers are diverse appendages, both in their motor capabilities and their anatomical composition. Supporting additional dimensions of finger input have largely been ignored because instrumenting the user with active or passive components is invasive.

At present, in order for a finger to perform different operations at a single point in space on a touch screen, it must be overloaded. Most common is a tap-and-hold period, or chording of the fingers (e.g., two-finger-tap for right click). This can trigger a transient contextual menu, which allows a user to select one of several actions. An alternative to finger overloading is breaking function out into one or more buttons. For example, there is a scheme in which one button is for minimizing a window and another button is for closing it. However, this is problematic for mobile devices with limited screen real estate.

Currently, touch screens do not distinguish between different types of finger contacts. For example, touching with the tip of the finger and touching with the knuckle are treated the same. As such, all finger touches have the same interactive outcome.

SUMMARY

In view of the above, the present invention provides a method and system for activating different interactive functions based on a classification of acoustic signals. In accordance with an aspect of the present invention, there is provided a system for classifying touch events, the system comprises a touch screen configured to display an interactive element; one or more acoustic sensors coupled to the touch screen; a touch event detector configured to monitor the one or more acoustic sensors and to save acoustic signals sensed by the one or more acoustic sensors, wherein the touch event detector is further configured to detect touch events in which the interactive element is touched by a first or a second finger part of a user, and wherein the touch events result in generating the acoustic signals; and an acoustic classifier configured to classify the acoustic signals.

BRIEF DESCRIPTION OF THE DRAWINGS

The above and other objects and features of the present invention will become apparent from the following description of an exemplary embodiment given in conjunction with the accompanying drawings, in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the exemplary embodiments are provided to make a full disclosure and also to allow those skilled in the art to understand the full range of the exemplary embodiments. Therefore, the exemplary embodiments are to be defined only by the scope of the appended claims.

FIGS. 1A to 4B are exemplary diagrams illustrating a concept of activating different interactive functions based on a classification of vibro-acoustic signals in accordance with an exemplary embodiment of the present invention;

In brief, the concept of the present invention may be described as follow. A user touches or contacts a touch screen with one of the finger parts, e.g., a finger tip. Such a touch event triggers a primary or conventional functionality, such as opening a file, dragging a file, launching an application, selecting a song, pressing a button, and the like. When a user touches the touch screen with another one of the finger parts, e.g., a knuckle or fingernail, an auxiliary function is launched on the same touch screen.

Although one or more exemplary embodiments explain and illustrate that a finger tip causes to activate a primary function and a knuckle or fingernail causes to activate an auxiliary function, the embodiments do not limit thereto. It should be noted that different combination of these finger parts or the use of other finger parts can also activate the primary and auxiliary functions.

Figure 1A:
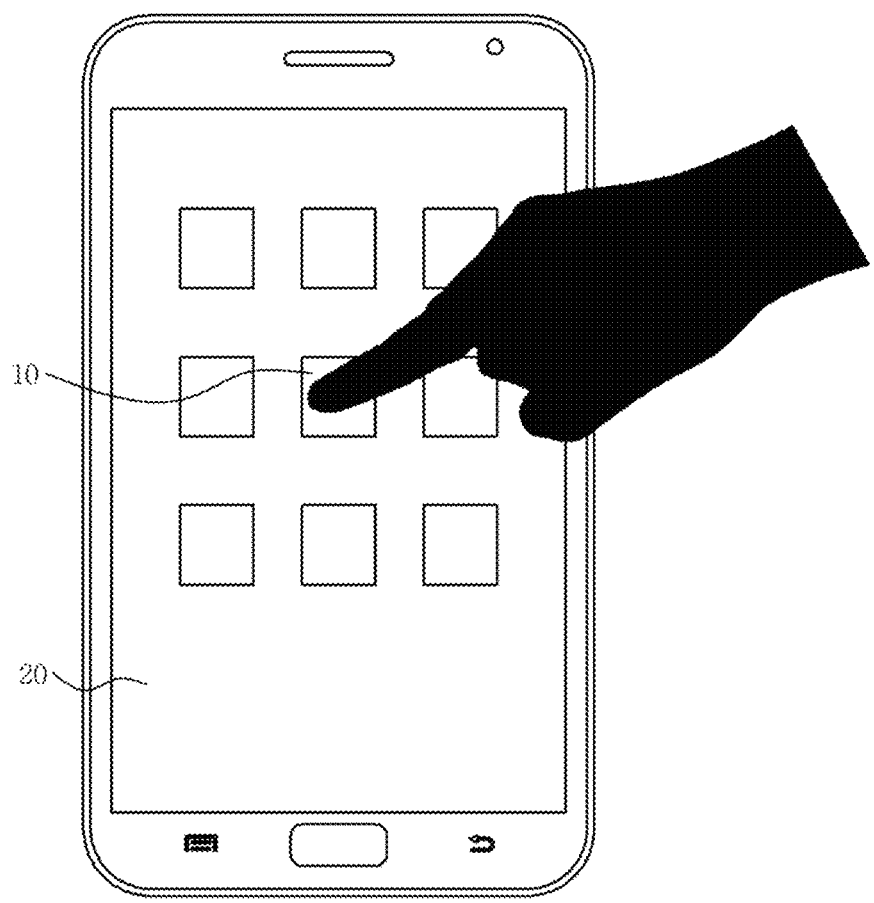
FIGS. 1A to 4B are exemplary diagrams illustrating a concept of activating different interactive functions based on a classification of vibro-acoustic signals in accordance with an exemplary embodiment of the present invention.

First, FIG. 1A illustrates one exemplary diagram that a fingertip is used to trigger a primary or conventional function.

As shown in FIG. 1A, when a user touches an interactive element 10 on a touch screen 20 with a fingertip, a primary or conventional function is triggered. The term of "interactive element" used herein may refer to a user interface such as an icon or a graphical object representing applications or services designed to activate a specific function related thereto. The specific function, for example, may include such actions opening, dragging, launching, selecting, or pressing a photo, a file, a text, an image, an application, a song, a button, a game, an in-game character or the like through the use of the applications or services.

Figure 1B:
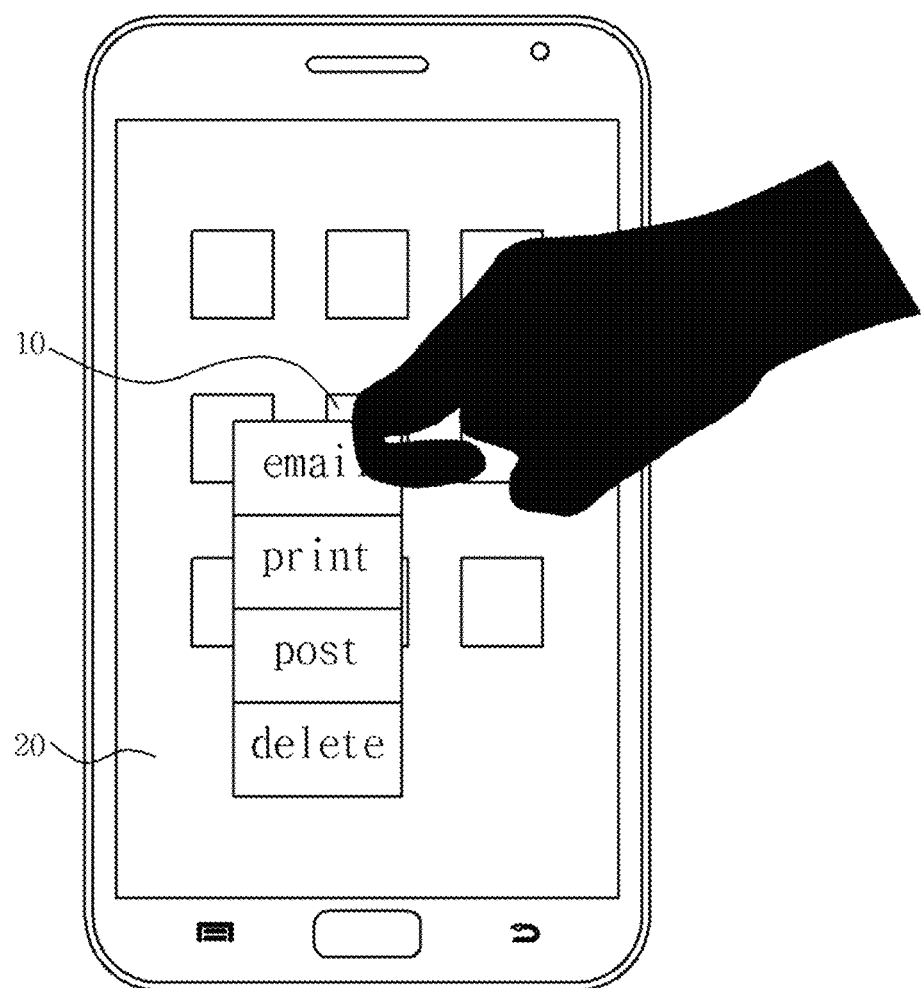
Figure 1C:
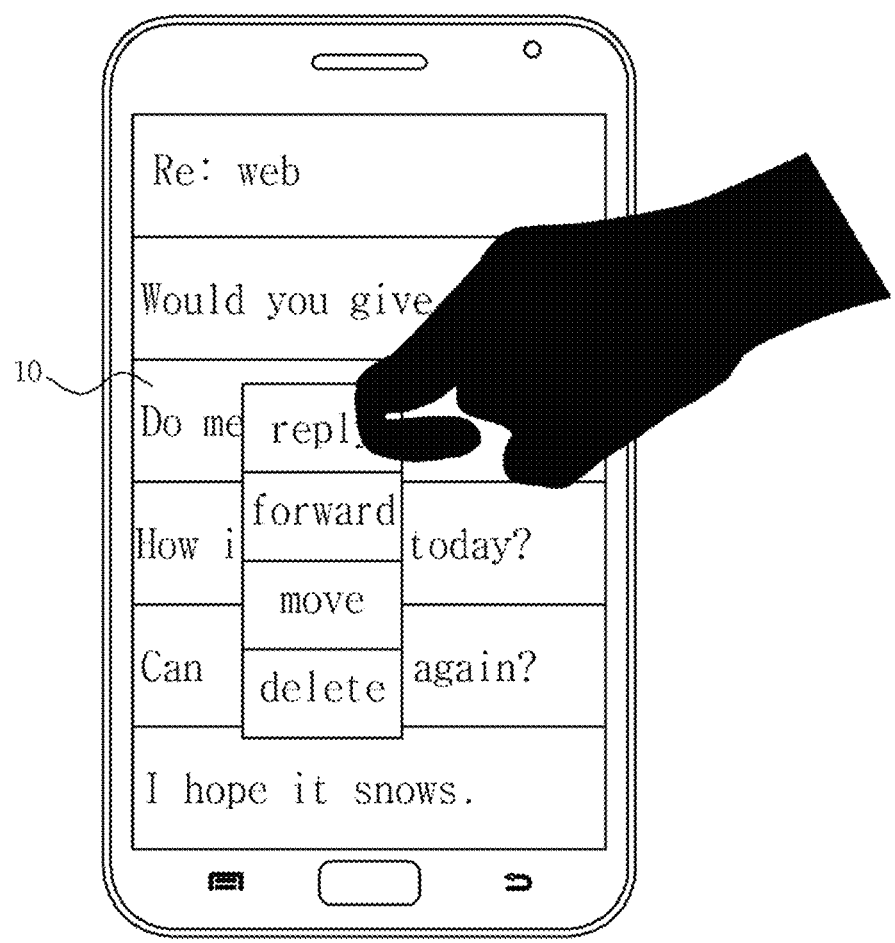

FIGS. 1B and 1C illustrate exemplary diagrams that a knuckle or fingernail is used to activate an auxiliary function such as a pop-up of context menus.

Referring to FIG. 1B, a fingertip may be used to scroll (i.e., translate a display window) as seen in contemporary touch interfaces. When a knuckle or fingernail touches an interactive element 10 on a touch screen 20, e.g., a photo, a contextual pop-up menu could appear with the following options: email, print, post, delete and the like. As another example, as shown in FIG. 1C, when a knuckle or fingernail touches an interactive element 10, e.g., an opened email, a context menu could appear with the following options: reply, forward, move, delete, and the like.

Figure 2A:
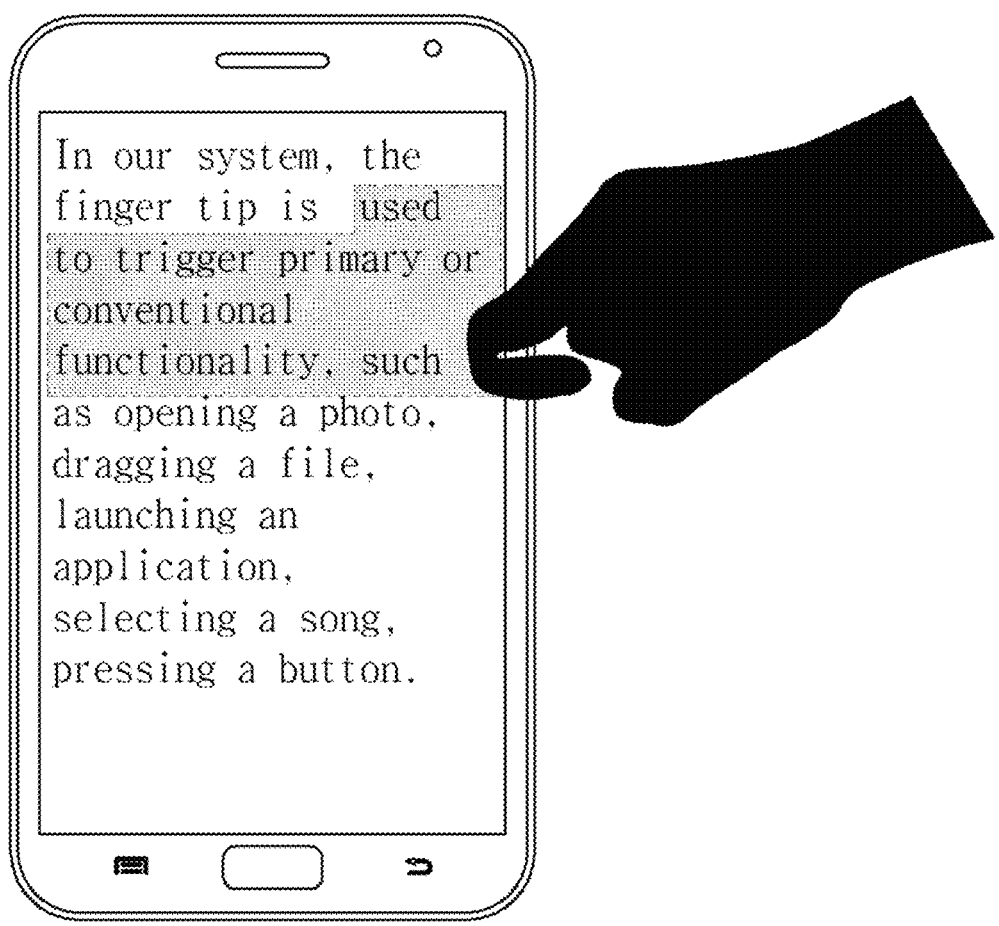
Figure 2B:
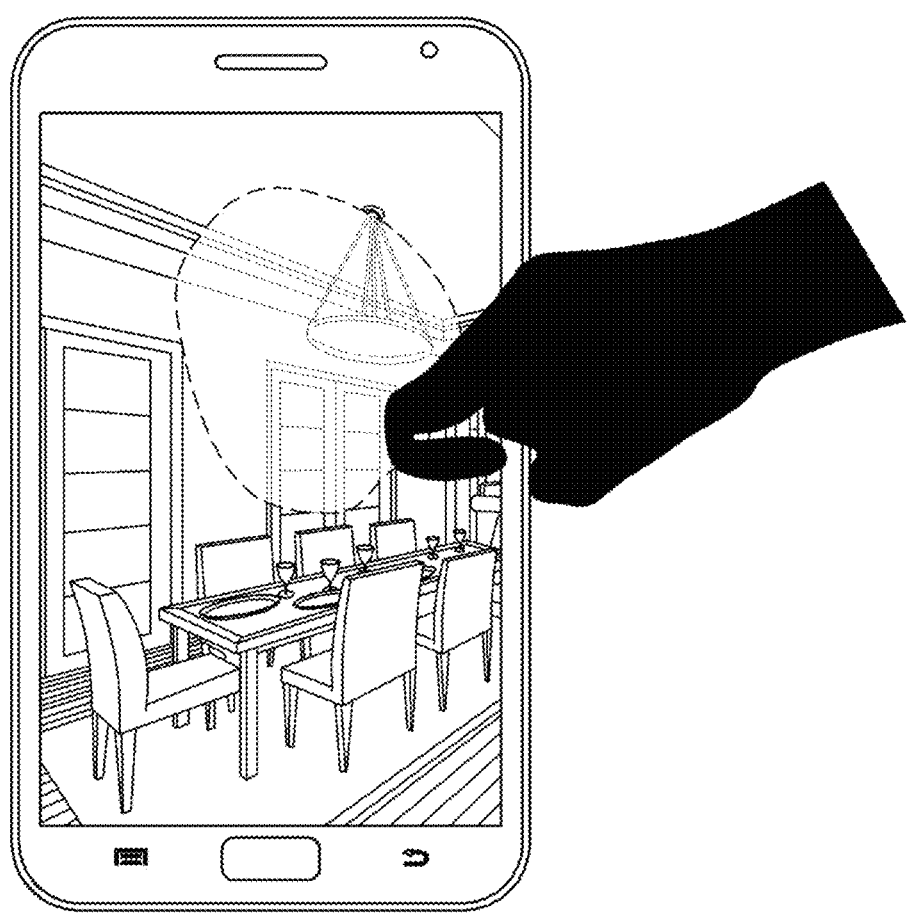
Figure 2C:
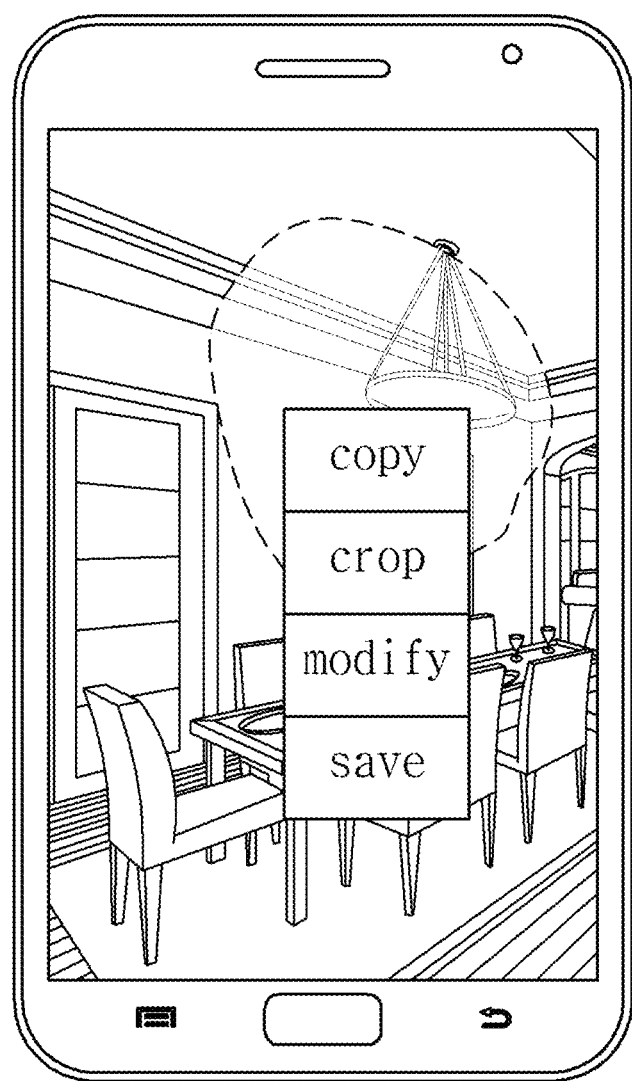

FIGS. 2A, 2B and 2C illustrate exemplary diagrams that the knuckle or fingernail can be used for interactions requiring selection.

In FIG. 2A, one exemplary embodiment includes a selection of text. A fingertip may be used to scroll (i.e., translate a display window) as seen in contemporary touch interfaces. Using a knuckle or fingernail, a user may touch and drag over a region of text to select the text. As another example, using a knuckle or fingernail, a user may touch and drag over a region of text to paint the text in a special color (e.g., a highlighting tool).

In FIG. 2B, using a knuckle or fingernail, a user may touch and drag over a region of an image to lasso select an arbitrary shaped sub-region of the image or a user may touch and drag over a region of an image to select a rectangular sub-region of the image. Finally, upon completion of this selection action, a context menu could automatically appear. For example, as illustrated in FIG. 2C, following an image region selection, a context menu could appear with the following options: copy, crop, modify, save, etc. As another example, following a text selection, a context menu could appear with the following options: copy, cut, paste, search, delete, etc.

Figure 3A:
Figure 3B:
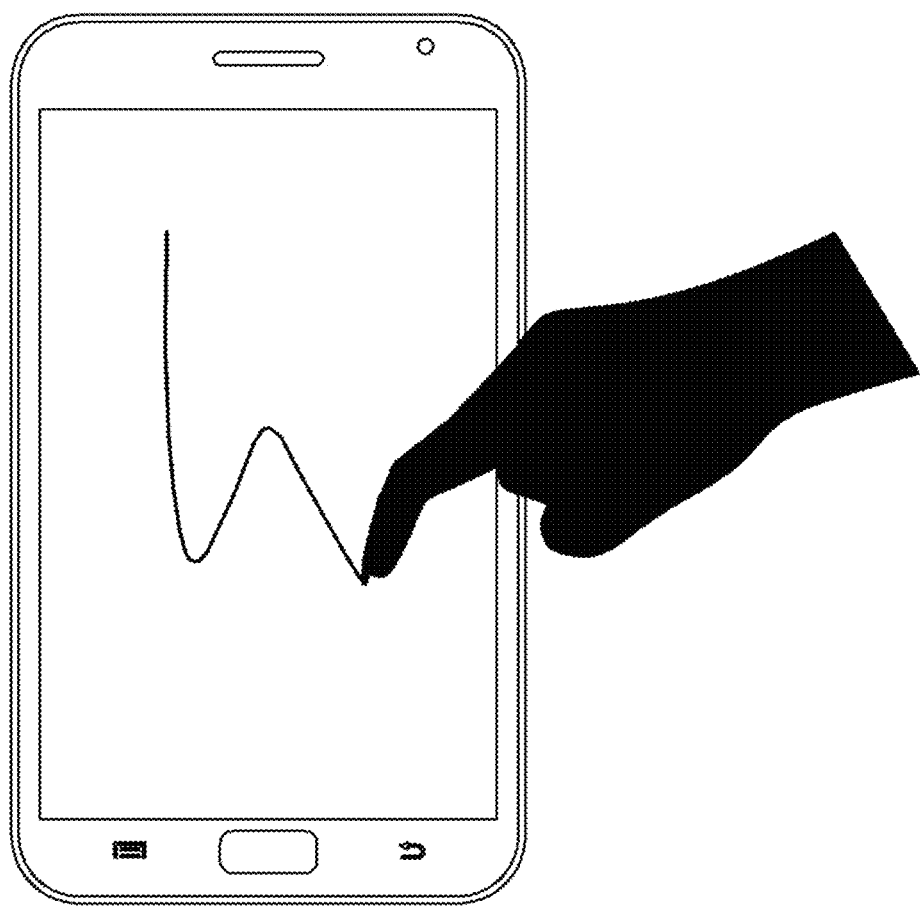
Figure 3C:
Figure 3D:
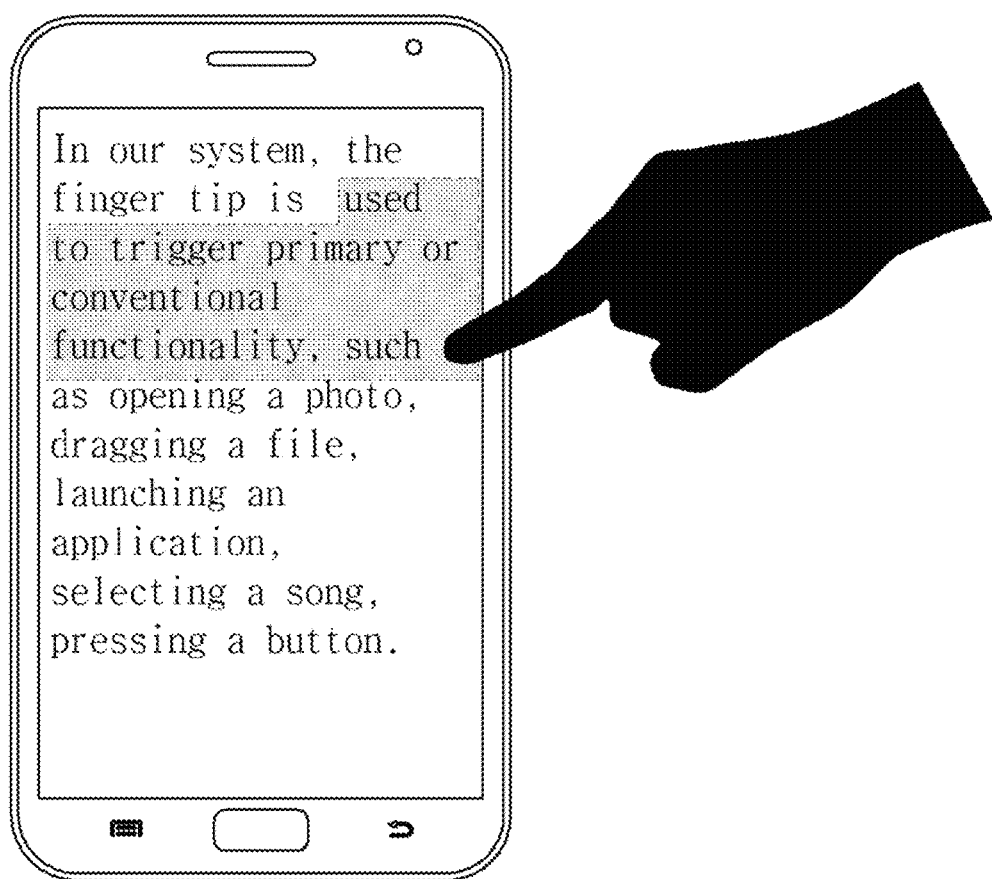
Figure 3E:
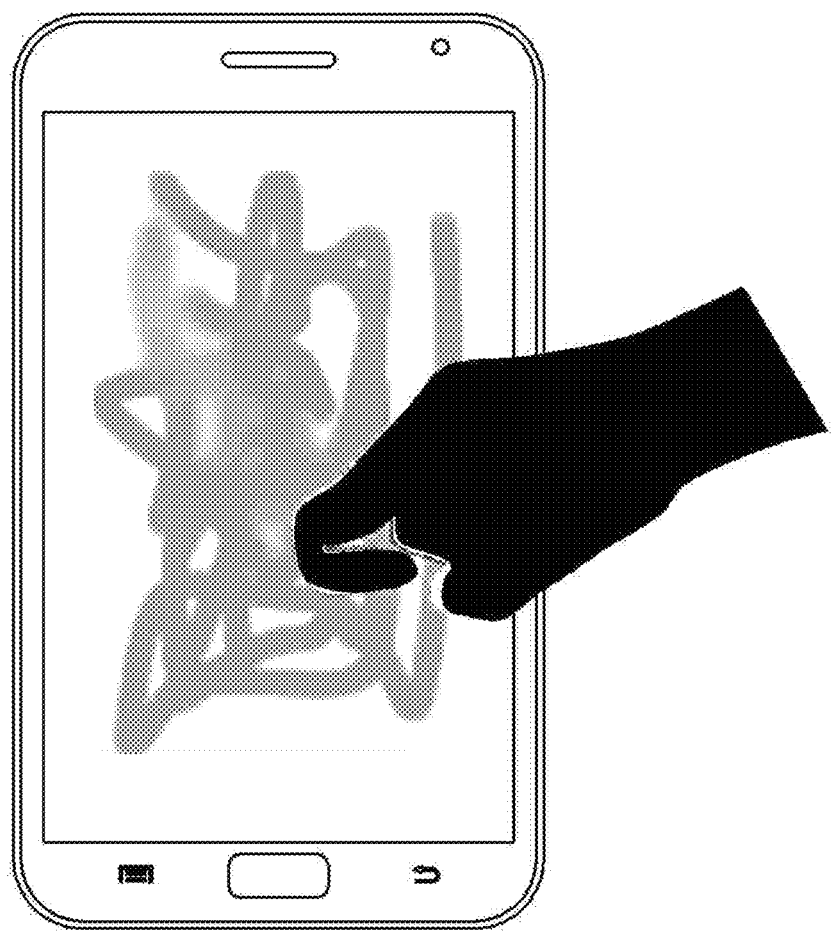

FIGS. 3A to 3E illustrate exemplary diagrams in which touches with the finger tip, knuckle and fingernail are used for different drawing actions in a drawing mode. In exemplary embodiment, the finger parts of the user are used as tools for different drawing actions in the drawing mode. For example, the fingertip may be used as a thick brush, the fingernail or knuckle as a fine marker, and the knuckle for erasing, as illustrated in FIGS. 3A, 3B, and 3C, respectively. Another exemplary configuration includes using the fingertip as a marker for highlighting the selected text region and the knuckle for smudging, as illustrated in FIGS. 3D and 3E, respectively.

Figure 4A:
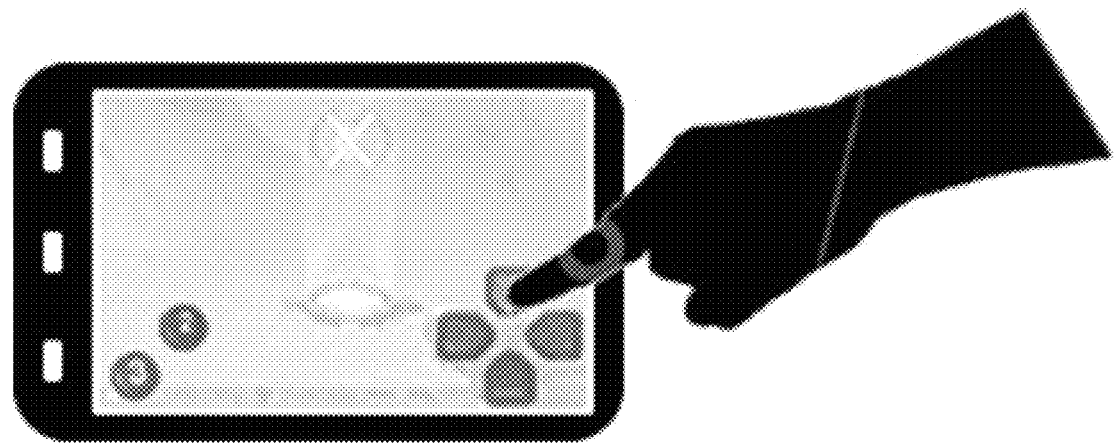
Figure 4B:
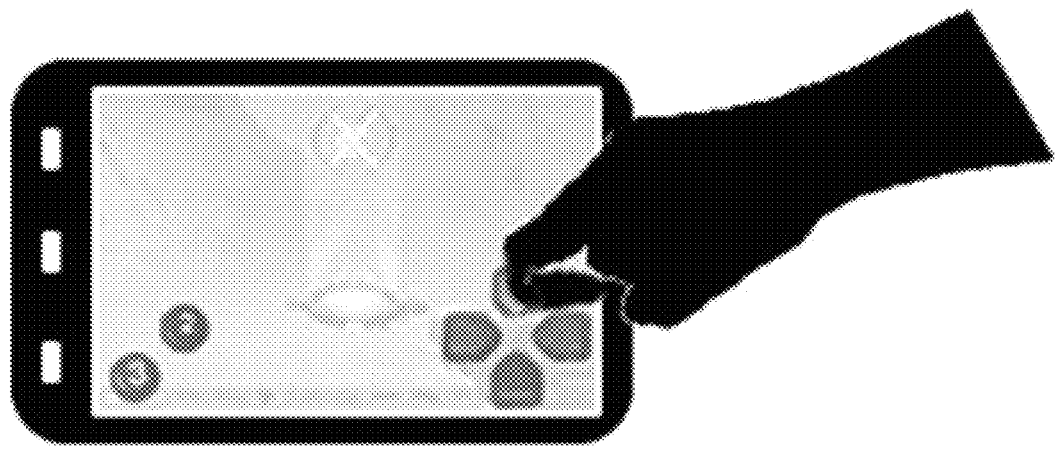

FIGS. 4A and 4B illustrate exemplary diagrams that the touches with the knuckle and fingernail can be used for auxiliary actions in games in concert with fingertip driven interactions.

As illustrated in FIG. 4A, using an onscreen movement control (e.g., virtual joy stick or arrow pad), a fingertip may be used for regular in-game character (i.e., player) movement. If a knuckle or fingernail is used, as illustrated in FIG. 4B, the directional player movement may be performed in a crouched position. As another example, a fingertip may be used for a primary weapon fire and a knuckle or fingernail for alternative weapon mode. Also, a touch with a fingernail may be used to run. In addition, a momentary tap of the knuckle or fingernail (i.e., a tap) may be used to jump an in-game character.

Figure 5:
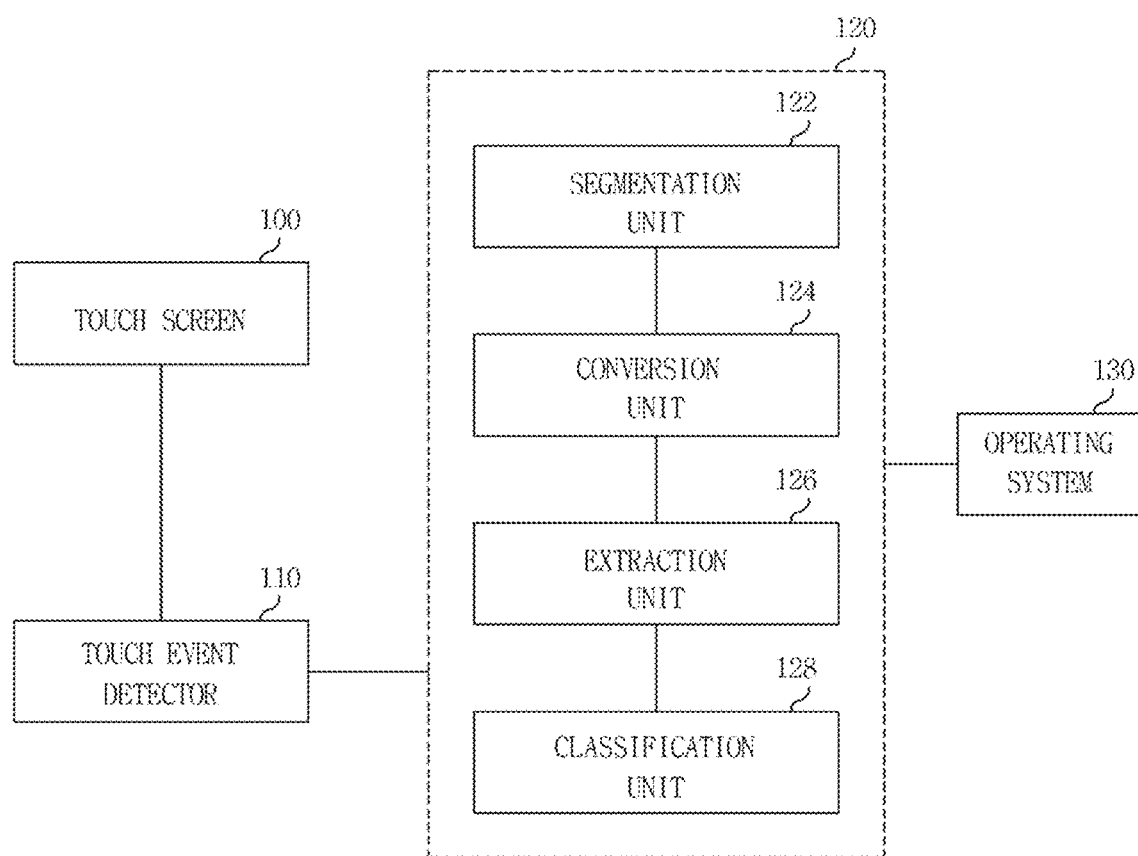
FIG. 5 is a block diagram of a computing system for activating different interactive functions based on a classification of vibro-acoustic signals in accordance with an exemplary embodiment of the present invention.

FIG. 5 is a block diagram of a computing system for distinguishing different interactive functions based on a classification of vibro-acoustic signals in accordance with an embodiment of the present invention.

The computing system of the embodiment may have an operating system (OS), and can run various types of services or applications, known as apps. The computing system may also be equipped with a telecommunication capability that can allow connections to communication network. Such a computing system may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 5, the computing system includes a touch screen 100, a touch event detector 110, a vibro-acoustic classifier 120, and an OS 130.

Figure 6:
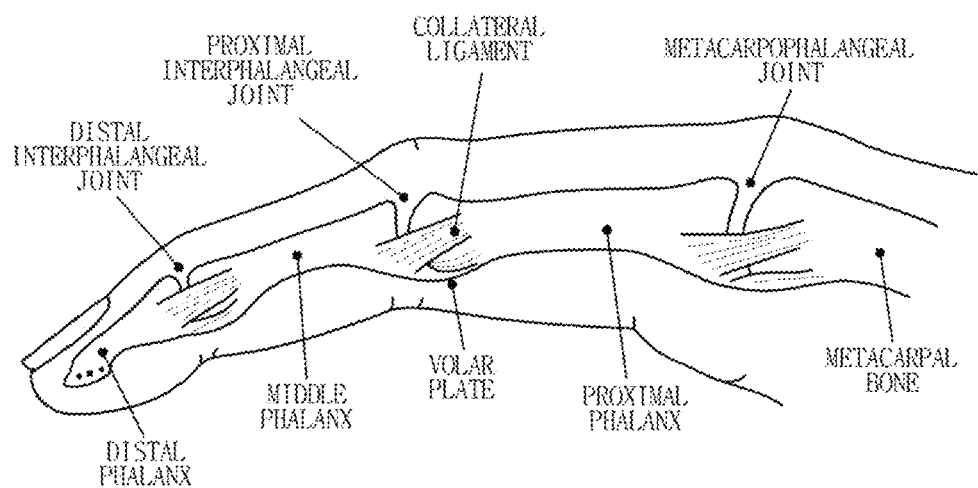
FIG. 6 illustrates an anatomical chart of finger parts for use in interacting with the computing system in accordance with an exemplary embodiment of the present invention.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, beyond the conventional tip of the finger, causes the OS 130 to activate the application or service related to the interactive elements. As shown in FIG. 6, fingers are diverse appendages, both in their motor capabilities and their anatomical compositions. A single digit contains different parts such as one or more knuckles, a tip, pad, and fingernail.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail encompasses all parts of the keratin (or artificial nail material), horn-like envelope covering the dorsal aspect of the terminal phalanges of fingers. The knuckle includes the immediate areas surrounding the boney joints of human fingers, including joints on the thumb, and both major and minor knuckles. Specifically, the boney regions are within a 1 cm radius surrounding the metacarpophalangeal joints and interphalangeal articulations.

Figure 7:
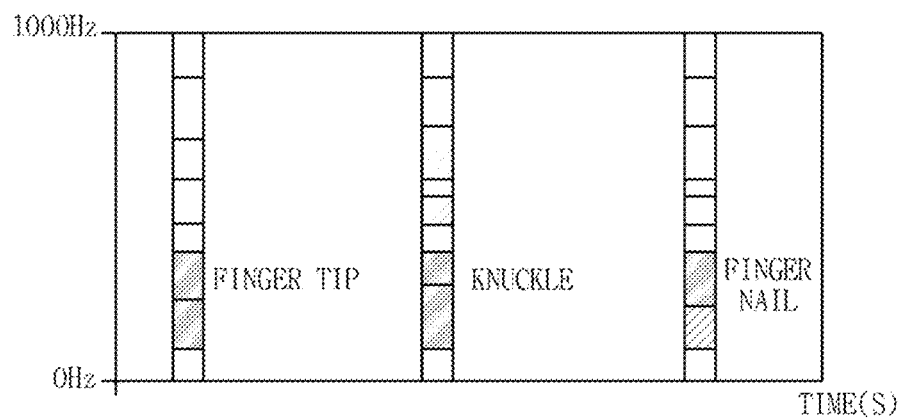
FIG. 7 shows a spectrogram of finger parts in accordance with an exemplary embodiment of the present invention.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when respective finger parts touch or contact the surface of the touch screen 100, vibro-acoustic responses are produced. The vibro-acoustic characteristics of the respective finger parts are unique, mirroring their unique anatomical compositions. For example, FIG. 7 illustrates a spectrogram of three types of the finger contact. As known from FIG. 7, the finger parts, that is, a fingertip, a knuckle, and a fingernail, produce different vibro-acoustic responses.

When a user wants to use an application or a service on the computing system, the user may touch an interactive element for the application or service with a finger part such as a fingertip, knuckle, or fingernail. Such a touch event results in the generation of a unique vibro-acoustic signal from the surface of the touch screen 100.

Referring back to FIG. 5, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone, a piezoelectric microphone, MEMS microphone and the like. Once the vibro-acoustic signal has been captured by the touch event detector 110, the vibro-acoustic classifier 120 processes the vibro-acoustic signal to distinguish which finger part was used.

The OS 130 runs the computing system so that the primary function or the auxiliary function can be activated in line with the classification of the vibro-acoustic signals.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify the finger part using the features to distinguish what finger part was used for the touch event.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further downsample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what finger part was used to generate the touch event, so that the computing system to selectively activate a primary function or an auxiliary function related to the interactive element depending on the classified vibro-acoustic signals.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. A system comprising:
   a touch screen for displaying an interactive element generated by one or more applications; one or more acoustic sensors associated with the touch screen;
   a touch event detector configured to monitor the one or more acoustic sensors and to save acoustic signals sensed by the one or more acoustic sensors and generated for a touch events from the interactive element being touched by a first or a second finger part of a user; and
   an acoustic classifier configured to:
   segment the acoustic signals into a digital representation of the acoustic signals,
   convert the digital representation of the acoustic signals into electrical signals,
   derive a series of features from the electrical signals, and use the series of features to distinguish whether a finger part used for the touch event is the first finger part or the second finger part, the one or more applications being configured to scroll a display window presented on the touch screen if the first finger part is used for the touch event or display a context menu having a plurality of selectable options if the second finger part is used for the touch event.

2. The system of claim 1, wherein the touch event detector is further configured to detect touch events in which a second interactive element of the touch screen is touched by a third or a fourth finger part of a user, resulting in generating second acoustic signals, the acoustic classifier is further configured to repeat the operations to segment, convert, derive, and use for the second acoustic signals from the third or fourth finger part, and the one or more applications are configured to scroll a display window presented on the touch screen if the third finger part is used for the touch events or highlight a text or image portion in the display window if the fourth finger is dragged over such text or image portion.

3. The system of claim 1, wherein the touch event detector is further configured to detect touch events in which a second interactive element displayed by the touch screen is touched by a third or a fourth finger part of a user, resulting in generating second acoustic signals, the acoustic classifier is further configured to repeat the operations to segment, convert, derive, and use for the second acoustic signals from the third or fourth finger part, and the one or more applications are configured to scroll a display window presented on the touch screen if the third finger part is used for the touch events or select a text or image portion in the display if the fourth finger is dragged over such text or image portion.

4. The system of claim 1, wherein the touch event detector is further configured to detect touch events in which a second interactive element displayed by the touch screen is touched by a third, fourth, or fifth finger part of a user, resulting in generating second acoustic signals, the acoustic classifier is further configured to repeat the operations to segment, convert, derive, and use for the second acoustic signals from the third, fourth, or fifth finger part to distinguish between the third, fourth, or fifth finger part, and the one or more applications include a drawing application that is configured to display a thick brush, a thin marker, or an eraser for drawing on the touch screen if the third, fourth, or fifth finger part, respectively, is used for the touch events.

5. The system of claim 1, wherein the touch event detector is further configured to detect touch events in which a second interactive element displayed by the touch screen is touched by a third or a fourth finger part of a user, resulting in generating second acoustic signals, the acoustic classifier is further configured to repeat the operations to segment, convert, derive, and use for the second acoustic signals from the third or fourth finger part, and the one or more applications include a gaming application that is configured to move a character on the touch screen if the third finger part is used for the touch events or move the character in a crouched position if the fourth finger is used for the touch events.

6. The system of claim 1, wherein the touch event detector is further configured to detect touch events in which a second interactive element displayed by the touch screen is touched by a third or a fourth finger part of a user, resulting in generating second acoustic signals, the acoustic classifier is further configured to repeat the operations to segment, convert, derive, and use for the second acoustic signals from the third or fourth finger part, and the one or more applications include a gaming application that is configured to display and use a primary weapon on the touch screen if the third finger part is used for the touch events or display and use an auxiliary weapon on the touch screen if the fourth finger is used for the touch events.

7. The system of claim 1, wherein the touch event detector is further configured to detect touch events in which a second interactive element displayed by the touch screen is touched by a third or a fourth finger part of a user, resulting in generating second acoustic signals, the acoustic classifier is further configured to repeat the operations to segment, convert, derive, and use for the second acoustic signals from the third or fourth finger part, and the one or more applications include a gaming application that is configured to move a character on the touch screen if the third finger part is used for the touch events or move the character in a fast mode if the fourth finger is used for the touch events.

8. The system of claim 1, wherein the acoustic signals saved by the touch event detector are transmitted to the acoustic classifier to enable the acoustic classifier to classify the acoustic signals, and the acoustic classifier identifies whether the first finger part or the second finger part of the user is used to touch the interactive element based on classifying the acoustic signals.

9. The system of claim 8, wherein the touch events result in the generation of the acoustic signals from a surface of the touch screen.

10. The system of claim 9, wherein the touch event detector is arranged at a rear side of the touch screen.

11. The system of claim 1, wherein segmenting the acoustic signals includes sampling the acoustic signals using a sliding window of samples of the acoustic signals.

12. The system of claim 11, wherein converting the digital representation includes performing a Fourier Transform on the sampled acoustic signals having time domain representation to generate the electrical signals having frequency domain representation, and wherein deriving the series of features is based on the frequency domain representation of the electrical signals.

13. A method comprising:
displaying an interactive element of a touch screen;
monitoring one or more acoustic sensors coupled to the touch screen to save acoustic signals sensed by the one or more acoustic sensors;
detecting touch events in which the interactive element is touched by a first or a second finger part of a user, wherein the touch events result in generating the acoustic signals;
classifying the acoustic signals by segmenting the acoustic signals into a digital representation of the acoustic signals, converting the digital representation of the acoustic signals into electrical signals, and deriving a series of features from the electrical signal;
determining whether the first finger part or the second finger part is used to touch the interactive element on the touch screen based on classified acoustic signals, and
scrolling a display window of the touch screen if the first finger part is determined to be used to touch the interactive element or displaying a context menu having a plurality of selectable options if the second finger part is determined to be used to touch the interactive element.

14. The method of claim 13, further comprising:
repeating the operations for detecting, classifying, and determining for a third and fourth finger part of a user, and scrolling a display window of the touch screen if the third finger part is determined to be used to touch the interactive element or highlighting or selecting a text or image portion in the display window if the fourth finger is dragged over such text or image portion.

15. The method of claim 13, wherein segmenting the acoustic signals comprise sampling the acoustic signals using a sliding window of samples of the acoustic signals.

16. The method of claim 15, wherein converting the digital representation of the acoustic signals comprises performing a Fourier Transform on sampled acoustic signals having time domain representation to generate the electrical signals having frequency domain representation.

17. The method of claim 16, wherein deriving the series of features comprise calculating a series of features from the frequency domain representation of the electrical signals, and distinguishing whether a finger part used for the touch event is the first finger part or the second finger part based on the series of features.

18. A non-transitory computer readable medium containing instructions for classifying touch events, wherein execution of the program instructions by a processor causes the processor to carry out the steps of:
displaying an interactive element of a touch screen;
monitoring one or more acoustic sensors coupled to the touch screen to save acoustic signals sensed by the one or more acoustic sensors;
detecting touch events in which the interactive element is touched by a first or a second finger part of a user, wherein the touch events result in generating the acoustic signals;
classifying the acoustic signals by segmenting the acoustic signals into a digital representation of the acoustic signals, converting the digital representation of the acoustic signals into electrical signals, and deriving a series of features from the electrical signal;
determining whether the first finger part or the second finger part is used to touch the interactive element on the touch screen based on the classified acoustic signals, and
scrolling a display window of the touch screen if the first finger part is determined to be used to touch the interactive element or displaying a context menu having a plurality of selectable options if the second finger part is determined to be used to touch the interactive element.

19. The non-transitory computer readable medium of claim 18, wherein segmenting the acoustic signals comprise sampling the acoustic signals using a sliding window of samples of the acoustic signals.

20. The non-transitory computer readable medium of claim 19, wherein converting the digital representation of the acoustic signals comprises performing a Fourier Transform on sampled acoustic signals having time domain representation to generate the electrical signals having frequency domain representation.

21. The non-transitory computer readable medium of claim 20, wherein deriving the series of features comprise:
calculating a series of features from the frequency domain representation of the electrical signals; and
distinguishing whether a finger part used for the touch event is the first finger part or the second finger part based on the series of features.

* * * * *

UNITED STATES PATENT AND TRADEMARK OFFICE
CERTIFICATE OF CORRECTION

PATENT NO. : 11,262,864 B2
APPLICATION NO. : 15/832080
DATED : March 1, 2022
INVENTOR(S) : Harrison et al.

Page 1 of 1

It is certified that error appears in the above-identified patent and that said Letters Patent is hereby corrected as shown below:

On the Title Page

Please amend Item (63) as follows:
(63) Continuation of application No. 14/612,089, filed on Feb. 2, 2015, now Pat. No. 9,864,454, which is a continuation of application No. 13/849,698, filed on Mar. 25, 2013, now Pat. No. 9,013,452.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*